(12) United States Patent
Caras et al.

(10) Patent No.: US 10,739,933 B2
(45) Date of Patent: Aug. 11, 2020

(54) REDUCED LATENCY SERVER-MEDIATED AUDIO-VIDEO COMMUNICATION

(71) Applicant: GLIDE TALK LTD., Jerusalem (IL)

(72) Inventors: Jonathan Caras, Jerusalem (IL); Adam Korbl, Jerusalem (IL); Yosef Sukenik, Jerusalem (IL); Roi Ginat, Ramat Gan (IL); Liron M. Hertz, Givataim (IL)

(73) Assignee: GLIDE TALK LTD., Jerusalem (IL)

( * ) Notice: Subject to any disclaimer, the term of this patent is extended or adjusted under 35 U.S.C. 154(b) by 841 days.

(21) Appl. No.: 14/758,040

(22) PCT Filed: Dec. 24, 2013

(86) PCT No.: PCT/IB2013/061311
§ 371 (c)(1),
(2) Date: Jun. 26, 2015

(87) PCT Pub. No.: WO2014/102720
PCT Pub. Date: Jul. 3, 2014

(65) Prior Publication Data
US 2015/0350270 A1 Dec. 3, 2015

(30) Foreign Application Priority Data
Dec. 28, 2012 (GB) .................................. 1223468.8

(51) Int. Cl.
*G06F 3/0481* (2013.01)
*H04L 29/06* (2006.01)
(Continued)

(52) U.S. Cl.
CPC .......... *G06F 3/0481* (2013.01); *G06F 3/0488* (2013.01); *H04L 51/10* (2013.01);
(Continued)

(58) Field of Classification Search
CPC ..... G06F 3/0481; G06F 3/0488; H04L 51/10; H04L 51/26; H04L 65/403; H04L 67/42;
(Continued)

(56) References Cited

U.S. PATENT DOCUMENTS 5,014,297 A 5/1991 Morita et al.
5,524,137 A 6/1996 Rhee
(Continued)

FOREIGN PATENT DOCUMENTS

CN 101079835 11/2007
CN 101150538 3/2008
(Continued)

OTHER PUBLICATIONS

Meech, John et al.: A Multi-Agent System for Personal Messaging, AGENTS '00 Proceedings of the Fourth International Conference on Autonomous Agents (Jun. 2000).
(Continued)

*Primary Examiner* — Nicholas R Taylor
*Assistant Examiner* — Chong G Kim
(74) *Attorney, Agent, or Firm* — Finnegan, Henderson, Farabow, Garrett & Dunner, LLP (57) ABSTRACT

Video communications between multiple computer systems configured to transmit and receive video content. A client transmitter is enabled to transmit a video message for display on the client recipient. The client transmitter is configured to transmit or record the video message to the video server. The video message is archived by the video server. When the client recipient is unavailable during the beginning of the transmission of the video message and when the client recipient is available later during the transmission of the video message, the client recipient is enabled
(Continued)

to display the video message from the beginning of the video message while the transmission of the video message is still ongoing.

16 Claims, 7 Drawing Sheets

(51) Int. Cl.

| | | |
|---|---|---|
| H04N 7/14 | (2006.01) | |
| H04L 12/58 | (2006.01) | |
| H04W 76/10 | (2018.01) | |
| H04W 24/08 | (2009.01) | |
| H04N 7/15 | (2006.01) | |
| G06F 3/0488 | (2013.01) | |
| H04M 3/537 | (2006.01) | |
| H04M 3/53 | (2006.01) | |

(52) U.S. Cl.
CPC ............ *H04L 51/26* (2013.01); *H04L 65/403* (2013.01); *H04L 67/42* (2013.01); *H04N 7/147* (2013.01); *H04N 7/15* (2013.01); *H04W 24/08* (2013.01); *H04W 76/10* (2018.02); *H04M 3/537* (2013.01); *H04M 3/5315* (2013.01)

(58) Field of Classification Search
CPC ......... H04N 7/147; H04N 7/15; H04W 24/08; H04W 76/02; H04M 3/5315; H04M 3/537
USPC ........................................................ 709/203
See application file for complete search history.

(56) References Cited

U.S. PATENT DOCUMENTS

| | | | |
|---|---|---|---|
| 5,673,205 A | 9/1997 | Brunson | |
| 6,212,550 B1 | 4/2001 | Segur | |
| 6,501,502 B1 | 12/2002 | Chen | |
| 6,873,575 B2 | 3/2005 | Yariazaki et al. | |
| 7,185,285 B2 | 2/2007 | Van Dok et al. | |
| 7,283,644 B2 | 10/2007 | Dorai et al. | |
| 7,283,854 B2 | 10/2007 | Sato et al. | |
| 7,409,205 B2 | 8/2008 | Mittal | |
| 7,613,773 B2 | 11/2009 | Watt | |
| 7,817,987 B2 | 10/2010 | Mian et al. | |
| 7,826,831 B2 | 11/2010 | Bettis et al. | |
| 7,937,417 B2 | 5/2011 | Seymour | |
| 8,019,055 B2 | 9/2011 | Grigoriev et al. | |
| 8,060,909 B2 | 11/2011 | Krikorian et al. | |
| 8,081,586 B2 | 12/2011 | Kiss | |
| 8,120,625 B2 | 2/2012 | Hinckley | |
| 8,166,119 B2 | 4/2012 | Ligh et al. | |
| 8,243,119 B2 | 8/2012 | Thapa | |
| 8,259,816 B2 | 9/2012 | Coleman, Sr. | |
| 8,279,716 B1 | 10/2012 | Gossweiler, III et al. | |
| 8,345,600 B2 | 1/2013 | Chang | |
| 8,363,145 B2 | 1/2013 | Iwamoto | |
| 8,401,582 B2 | 3/2013 | Katis et al. | |
| 8,412,364 B2 | 4/2013 | Li et al. | |
| 8,417,784 B2 | 4/2013 | Mandre | |
| 8,472,520 B2 | 6/2013 | Banerjee | |
| 8,499,323 B2 | 7/2013 | Clark | |
| 8,510,398 B2 | 8/2013 | Yasrebi et al. | |
| 8,520,736 B2 | 8/2013 | Topiwala | |
| 8,560,004 B1 | 10/2013 | Tsvetkov et al. | |
| 8,572,196 B2 | 10/2013 | Anderson et al. | |
| 8,594,464 B2 | 11/2013 | Liu | |
| 8,635,293 B2 | 1/2014 | Fisher et al. | |
| 8,681,873 B2 | 3/2014 | Bivolarsky et al. | |
| 8,700,072 B2 | 4/2014 | Pascal et al. | |
| 8,725,842 B1 | 5/2014 | Al-Nasser | |
| 8,760,512 B2 | 6/2014 | Ogi et al. | |
| 8,782,158 B2 | 7/2014 | Cropper et al. | |
| 8,782,275 B2 | 7/2014 | Karlsson et al. | |
| 8,788,977 B2 | 7/2014 | Bezos | |
| 8,804,036 B1 | 8/2014 | Woodall | |
| 8,819,741 B2 | 8/2014 | Middleton et al. | |
| 8,824,645 B2 | 9/2014 | Roberts et al. | |
| 8,825,812 B2 | 9/2014 | Asher | |
| 8,838,696 B2 | 9/2014 | Tiwari et al. | |
| 8,862,173 B2 | 10/2014 | Marocchi et al. | |
| 8,863,208 B2 | 10/2014 | Calvert | |
| 8,869,181 B2 | 10/2014 | Ku et al. | |
| 8,931,011 B1* | 1/2015 | Hitchcock ............ H04N 21/472 725/52 |
| 8,947,382 B2 | 2/2015 | Winkler et al. | |
| 9,584,834 B1* | 2/2017 | Bush .................... H04N 21/266 |
| 2003/0043042 A1 | 3/2003 | Moores, Jr. et al. | |
| 2003/0079039 A1 | 4/2003 | Forkner et al. | |
| 2004/0202117 A1 | 10/2004 | Wilson et al. | |
| 2005/0154728 A1 | 7/2005 | Greve | |
| 2005/0276164 A1 | 12/2005 | Amron | |
| 2006/0015799 A1 | 1/2006 | Sung et al. | |
| 2007/0174425 A1* | 7/2007 | Gousse .................. G06Q 10/10 709/217 |
| 2007/0282905 A1 | 12/2007 | Karlberg | |
| 2008/0134235 A1* | 6/2008 | Kalaboukis .............. H04N 5/76 725/32 |
| 2008/0270556 A1 | 10/2008 | Bamford et al. | |
| 2009/0010485 A1* | 1/2009 | Lamb ..................... H04N 7/147 382/100 |
| 2009/0037826 A1 | 2/2009 | Bennetts | |
| 2009/0089188 A1* | 4/2009 | Ku ........................ G06Q 10/107 705/30 |
| 2009/0103521 A1 | 4/2009 | Katis et al. | |
| 2009/0228808 A1* | 9/2009 | MacDonald ........... G06Q 10/10 715/756 |
| 2010/0169480 A1 | 7/2010 | Pamidiparthi | |
| 2010/0214419 A1* | 8/2010 | Kaheel .................... H04N 5/272 348/207.1 |
| 2010/0217887 A1 | 8/2010 | Bouazizi et al. | |
| 2010/0235428 A1 | 9/2010 | Kikkawa | |
| 2011/0066743 A1* | 3/2011 | Hurley .................... H04W 4/02 709/231 |
| 2011/0141220 A1 | 6/2011 | Miura | |
| 2011/0264751 A1 | 10/2011 | Jans | |
| 2011/0276637 A1* | 11/2011 | Thornton ................ G06F 3/048 709/206 |
| 2012/0092438 A1* | 4/2012 | Guzman Suarez ...... H04N 7/15 348/14.03 |
| 2012/0109979 A1 | 5/2012 | Bernhardt | |
| 2012/0162350 A1 | 6/2012 | Lee et al. | |
| 2012/0182384 A1 | 7/2012 | Anderson et al. | |
| 2012/0188376 A1 | 7/2012 | Chatow et al. | |
| 2012/0209902 A1 | 8/2012 | Outerbridge | |
| 2012/0224825 A1 | 9/2012 | Royall et al. | |
| 2012/0331405 A1 | 12/2012 | Eidelson et al. | |
| 2013/0013698 A1* | 1/2013 | Relyea .................... H04L 67/06 709/206 |
| 2013/0027537 A1 | 1/2013 | Li | |
| 2013/0034262 A1 | 2/2013 | Surty et al. | |
| 2013/0063611 A1 | 3/2013 | Papakipos et al. | |
| 2013/0091528 A1 | 4/2013 | Honda | |
| 2013/0135196 A1 | 5/2013 | Park et al. | |
| 2013/0263180 A1* | 10/2013 | Yang ................. H04N 21/25891 725/32 |
| 2013/0271655 A1* | 10/2013 | Krahnstoever .... H04N 21/2187 348/500 |
| 2013/0276048 A1* | 10/2013 | Krasic ................ H04N 21/2187 725/116 |
| 2013/0283330 A1 | 10/2013 | Hengeveld | |
| 2013/0329074 A1 | 12/2013 | Zhang et al. | |
| 2014/0028546 A1 | 1/2014 | Jeon et al. | |
| 2014/0036090 A1* | 2/2014 | Black .................. H04N 21/44016 348/159 |
| 2014/0068649 A1 | 3/2014 | Badros et al. | |
| 2014/0101551 A1 | 4/2014 | Sherrets et al. | |
| 2014/0118474 A1* | 5/2014 | Fluhr ..................... H04L 65/403 348/14.09 |
| 2014/0143785 A1 | 5/2014 | Mistry et al. | |

(56) References Cited

U.S. PATENT DOCUMENTS

| | | | |
|---|---|---|---|
| 2014/0192134 | A1 | 7/2014 | Jung et al. |
| 2014/0197922 | A1 | 7/2014 | Stanwood et al. |
| 2014/0229835 | A1 | 8/2014 | Ravine |
| 2014/0244505 | A1 | 8/2014 | Kim |
| 2014/0267020 | A1 | 9/2014 | Ishibashi |
| 2014/0283013 | A1 | 9/2014 | Marco et al. |
| 2014/0347507 | A1 | 11/2014 | Yanagidate |
| 2014/0354689 | A1 | 12/2014 | Lee et al. |
| 2014/0379816 | A1 | 12/2014 | Lin et al. |
| 2015/0032858 | A1* | 1/2015 | Motrenko ............... H04L 51/10 709/219 |

FOREIGN PATENT DOCUMENTS

| | | |
|---|---|---|
| CN | 102378012 | 3/2012 |
| CN | 102497600 | 6/2012 |
| CN | 102780687 | 11/2012 |
| CN | 103023742 | 4/2013 |
| CN | 103197351 | 4/2013 |
| CN | 103337110 | 10/2013 |
| CN | 103546437 | 1/2014 |
| CN | 103680025 | 1/2014 |
| CN | 203793284 | 8/2014 |
| EP | 1643744 | 4/2006 |
| EP | 2048853 | 4/2009 |
| EP | 2131536 | 12/2009 |
| EP | 2476250 | 7/2012 |
| GB | 2509323 | 7/2014 |
| GB | 2511983 | 9/2014 |
| JP | 11187349 | 7/1999 |
| KR | 20070075637 | 7/2007 |
| KR | 20120062551 | 6/2012 |
| WO | WO 2004034674 | 4/2004 |
| WO | WO 2004112368 | 12/2004 |
| WO | WO 2008048848 | 4/2008 |
| WO | WO 2009070841 | 6/2009 |
| WO | WO 2010145573 | 12/2010 |
| WO | WO 2012131708 | 12/2010 |
| WO | WO 2014066352 | 5/2014 |

OTHER PUBLICATIONS

Olson, Parmy: Are You Ready for Video Messaging, http://www.forbes.com/sites/parmyoison (Aug. 8, 2013).

Gerla, Mario: Implementation of Proxy/Buffering Strategies in Mpeg Transmission for Intermittent Connectivity, CS 218: Advanced Computer Networks, University of California Los Angeles (Fall 2003).

Ng, Eng Chui: Educational Chatting System (Local Area Network), University Malaysia Pahang (2010).

Features of Skype, http://en.wikipedia.org/wiki/FeaturesofSkype, (accessed Feb. 3, 2015).

Schulzrinne, H.: Indication of Message Composition for Instant Messaging, Network Working Group RFC:3994, https://tools.ietf.org/html/draft-ietf-simple-iscomposing-02 (Jan. 2005).

Laird, Sam: Is Threadlife the Social Video App to Finally Rule Them All?, http://mashable.com/2012/10/31/threadlife/ (Oct. 31, 2012).

"Step-by-Step Guide for Recording a Message with Proclaim Messenger Using the Android", Netbriefings Web Communication Experts, (accessed Feb. 10, 2015).

Bidwell, Jamie: Track Your Video With Viewer Notifications, http://www.covideo.com/2011/track-your-video-with-viewer-notifications/ (Jun. 17, 2011).

Andrew, Jacob: What Does a Pending Message in Skype Mean?, http://www.ehow.com/info_8753069_pending-message-skype-mean.html (accessed Jan. 30, 2015).

Perlmutter, Patrick: The 4 Kick Ass Features You've Been Waiting for, http://blog.infinit.io/the-4-kick-ass-features-youve-been-waiting-for/ (Apr. 15, 2014).

Umar: PauseForLater: Resume Watching Online Videos Where You Left Them, http://www.makeuseof.com/tag/pauseforlater-resume-online-videos/ (Mar. 18, 2012).

International Search Report and Written Opinion Issued in International Application No. PCT/IB2013/061311 dated Jun. 30, 2015, 8 pages.

European Patent Office, Decision to Refuse a European Patent Application, App. No. 13 827 044.2-1908, dated Nov. 2, 2017 (22 pages).

European Patent Office, Provision of the Minutes in Accordance with Rule 124(4) EPC, App. No. 13 827 044.2-1908, dated Nov. 2, 2017 (8 pages).

European Patent Office, Provision of a Copy of the Minutes in Accordance with Rule 124(4) EPC, App. No. 13 827 044.2-1908, dated Nov. 2, 2017 (14 pages).

European Patent Office, Result of Consultation, App. No. 13 827 044.2-1908, dated Nov. 2, 2017 (14 pages).

European Patent Office, Communication Pursuant to Rules 161(1) and 162 EPC, App. No. 13 827 044.2-1908, dated Sep. 14, 2017 (3 pages).

European Patent Office, Summons to Attend Oral Proceedings Pursuant to Rule 115(1) EPC, App. No. 13 827 044.2-1908, dated Aug. 31, 2017 (3 pages).

European Patent Office, Summons to Attend Oral Proceedings Pursuant to Rule 115(1) EPC, App. No. 13 827 044.2-1908, dated Nov. 30, 2016 (6 pages).

European Patent Office, Communication Pursuant to Article 94(3) EPC, App. No. 13 827 044.2-1908, dated May 18, 2016 (5 pages).

Australian Government, IP Australia, Patent Examination Report No. 1, App. No. 2013368906, dated Nov. 25, 2016 (3 pages).

[Translation] Text of First Office Action (PCT), Chinese Patent App. No. 201380072948.1 (2 pages).

First Office Action, Chinese Patent App. No. 201380072948.1, dated Mar. 6, 2017 (5 pages).

[Translation] Text of Second Office Action (PCT), Chinese Patent App. No. 201380072948.1 (2 pages).

Second Office Action, Chinese Patent App. No. 201380072948.1, dated Nov. 27, 2017 (3 pages).

[Translation] Notification of Reexamination, Chinese Patent App. No. 201380072948.1, dated Mar. 12, 2020 (7 pages).

* cited by examiner

REDUCED LATENCY SERVER-MEDIATED AUDIO-VIDEO COMMUNICATION

CLAIM OF PRIORITY

This application is a national stage entry of PCT Application No. PCT/IB2013/061311, filed on Dec. 24, 2013, which claims priority to United Kingdom Application No. 1223468.8, filed on Dec. 28, 2012. Both of the above applications are incorporated by reference in their entirety.

BACKGROUND

1. Technical Field

The field of the present disclosure relates to communications and particularly relates to a platform for audio-video communications.

2. Description of Related Art

An Internet service such as SKYPE™ enables audio or audio-video conversations between two or more users. A server is used to initiate the conversation and negotiation of the type of media. The actual audio or video streams between the users are transferred in a peer-to-peer session without further server mediation.

In services such as SKYPE™, the peer-to-peer session is established to avoid creating a bottle-neck caused by overloading a server with traffic and to avoid introducing latency through the server.

iMessage™ is a service that allows users to send texts, photos, videos, contact information, and group messages.

AOL Instant Messenger (AIM) is a service to allow users to communicate in real time.

WhatsApp™ Messenger is a proprietary, cross-platform instant messaging service for smart phones. In addition to text messaging, users can send to each other images, video, and audio media messages.

A traditional radio frequency half-duplex communications system provides communications from a single transmitter to one or more receivers. Only one transmitter may be broadcasting at a time because the same physical channel is shared for broadcasting to all receiving parties. Once receivers begin to receive a signal, the receiving parties need to wait for the transmitter to stop transmitting, before replying since the physical communications channel is unavailable.

BRIEF SUMMARY

Various data communications systems are disclosed herein of video communications between multiple computer systems configured as client computer systems. One (or more) of the client computer systems when transmitting is a client transmitter and one (or more) of the client computer systems when receiving or consuming is a client recipient. The client transmitter is enabled to transmit or record a video message for display on the client recipient. The client transmitter is configured to establish a connection with a video server and to transmit the video message to the video server. The video message is archived by the video server. If the client recipient is unavailable during the beginning of the transmission of the video message and when the client recipient is available later during the transmission of the video message, then the client recipient is enabled to display the video message from the beginning of the video message while the transmission of the video message is still ongoing.

The client computer systems may be configured to alternate between being a client transmitter and a client receiver and to alternately transmit and receive video content.

A management server may be adapted to receive from the client transmitter a first character string including a reference to the client recipient and in response transmit to the client recipient a second character string including a reference to the client transmitter. In response to the second character string, the client recipient is configured to transmit a third character string to the video server. The third character string references the video message and upon receipt by the video server of the third character string, the video server transmits the video message to the client recipient.

When the client recipient is unavailable, the client recipient may be adapted to retrieve the video message from a message archive of the video server when the client recipient is later available. Multiple client computer systems configured as client transmitters may transmit respective video messages simultaneously to the client recipient.

Various client computer systems and/or software applications thereof may be configured for use in the data communications network The client computer system and/or software applications may include a transmitter module configured to: establish the connection with the video server, transmit a first video message to the video server and transmit to the management server the first character string. The client computer system and/or software applications may include a receiver module configured to: transmit the second character string to the video server, receive a second video message; and display the second video message.

Various management servers and/or software applications thereof may be configured for use in the data communications network. The management server may include: a management receiver module adapted to receive from the client transmitter the first character string and a management transmitter module adapted to transmit the second character string to the client recipient.

Various video servers may be configured for use in the data communications network. The video server includes: a network adapter configured to establish the connection with the client transmitter and receive the video message and a video data storage adapted to archive the video message. The network adapter is configured to receive the third character string and to transmit the video message to the client recipient responsive to the third character string.

Various methods are disclosed herein for management of video communications between multiple computer systems. One (or more) of the client computer systems when transmitting is a client transmitter and one or more of the client computer systems when receiving or consuming is a client recipient. The client transmitter is enabled to transmit a video message for display on the client recipient. The client transmitter is configured to establish a connection with a video server, to transmit a video message to the video server. The video message is archived by the video server. When the client recipient is unavailable during the beginning of the transmission of the video message and when the client recipient is available later during the transmission of the video message, the client recipient is enabled to display the video message from the beginning of the video message during the transmission of the video message to the video server.

The video message may be received and displayed by the client recipient.

The client computer systems may be configured to alternate between being a client transmitter and a client receiver and to alternately transmit and receive respectively.

The client recipient may be selected for receiving or consuming the video message while the video message is being transmitted to the video server. The connection may be established autonomously without intervention by a user of the client transmitter. The connection may be established responsive to a program previously installed in the client transmitter by monitoring actions of a user of the client transmitter and the connection is established based on said monitored actions of the user. Transmission by the client recipient of the second character string to the video server may be performed without prior notification to a user of the client recipient.

Latency is reduced by transmitting the video message from the video server to the client recipient while transmitting the video message from the client transmitter to the video server.

Various computer readable media may be encoded with processing instructions for causing a processor of the client computer system and/or a processor of the video server and/or a processor of the management server the execute the methods as disclosed herein.

The foregoing and/or other aspects will become apparent from the following detailed description when considered in conjunction with the accompanying drawing figures.

BRIEF DESCRIPTION OF THE DRAWINGS

The invention is herein described, in a non-limiting manner, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

By way of introduction, embodiments of the present invention are directed to provide a video communications system and method with a user experience similar to half-duplex communications (sometimes known as "walkie-talkie" or "push-to-talk") as well known in radio-frequency communications. The average length of a "full-duplex" session using a service such as Skype™ may be over ten minutes. The initialization time needed by existing technology to initiate a video stream using a prior art video service may range between 10 and 30 seconds depending on the network and the implementation used. This initialization time may be acceptable in prior art video services such as Skype™. Assuming a ten minute video session, for example, thirty seconds of initialization time for the 10 minute session amounts to 4.76% overhead. Embodiments of the present invention are intended to accommodate audio and/or video messages or bursts of average length 20 to 30 seconds. An initialization time of 30 seconds to transfer a 25 second audio and/or video message would amount to 54.5% overhead which would not be acceptable. Therefore, one of the technical problems being solved in embodiments of the present invention is to provide a user experience of "half-duplex" communications system while minimizing initialization time and other time latencies so the user experiences near real time message transfer.

In sum, embodiments of the present invention are directed to an audio-video messaging communications platform appropriate for conversations including short audio-video message bursts, e.g. 10-30 seconds long, with a reduced initialization time and overall latency of less than three to five seconds. Within one to two seconds after initiating transmission, the video content being recorded by a user is already being archived at a server and available to or being consumed by all the users sharing a communications thread. A user of an embodiment of the present invention may participate with other users to share video content in near real time. If the user is not available, e.g. not online, then the video content and the messages may be consumed later by streaming from the archive. If a user is an intended recipient and is unavailable at the time transmission began and becomes available thereafter and as a result enters late into a communications thread, then the user may consume the video content from the beginning of the thread when transmission of the video content began and participate in the thread without missing the beginning of the thread. Streaming from the archive enables multiple users to transmit to the same recipient at the same time and the recipient may receive and consume all the video content from all the users, for instance in the order of transmission.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
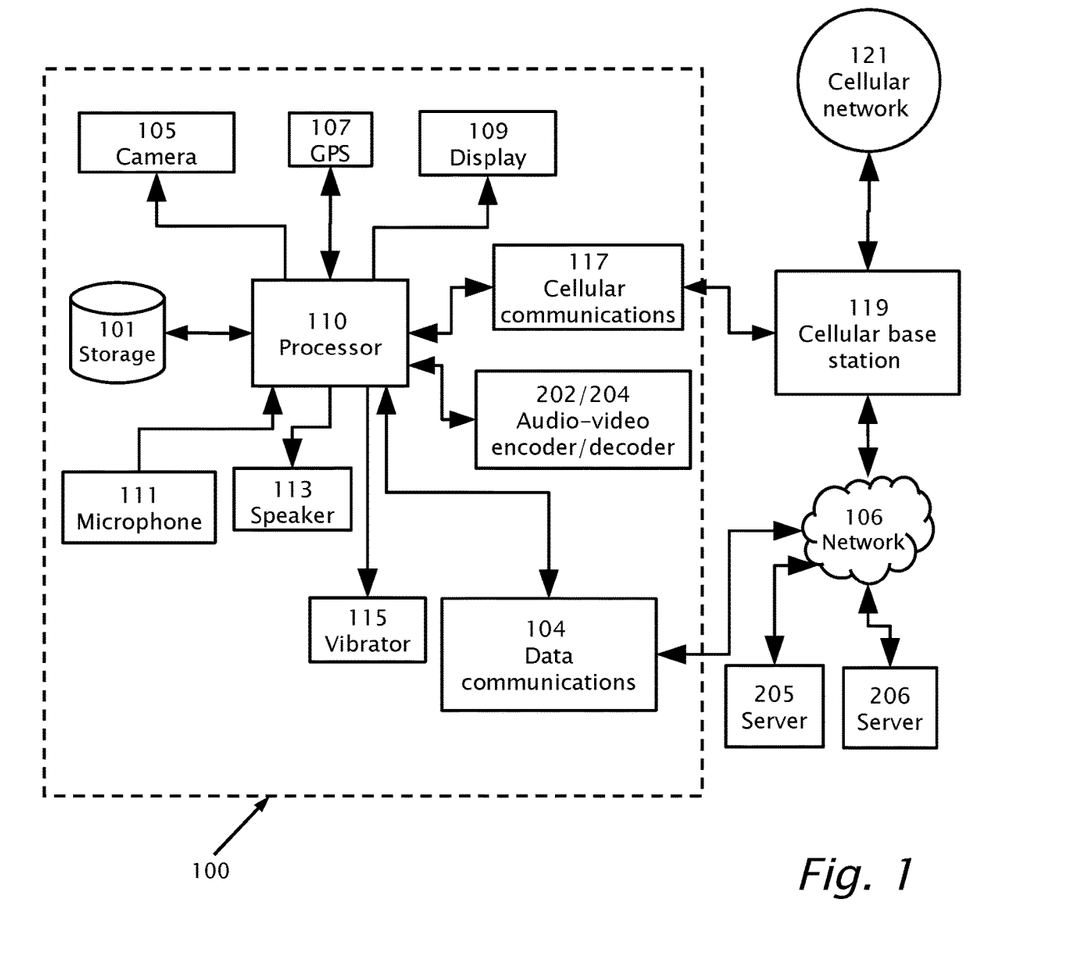
FIG. 1 illustrates a simplified block diagram of a mobile computer system according to features of the present invention.

Referring now to the drawings, FIG. 1 illustrates a simplified block diagram of a mobile computer system 100 according to features of the present invention. Mobile computer system 100 is may connect through a cellular base station 119 to cellular network 121. A cellular communications module 117 connects processor 110 to cellular network 121. Mobile computer system 100 may also connect over a data communications network 106 to a server 205 and to a server 206. Mobile computer system 100 includes a processor 110 connected to local data storage 101. A data communications module 104 operatively connects processor 110 to data communications network 106. An audio-video encoder 202 and an audio-video decoder 204 are used to encode and decode respectively audio-video content sent from and received by mobile computer system 100. Audio-video content of audio-video encoder 202 and audio-video decoder 204 may include audio or video which includes multiple channels, for example stereoscopic video or sound each of which include right and left audio channels. Mobile computer system 100 may include peripheral accessory devices such as a display 109, global positioning system (GPS) receiver 107, a camera 105, a microphone 111, a speaker 113, a vibrator 115, accelerometer/gravity sensor (not shown), near field communication (NFC) (not shown), radio-frequency identification (RFID) (not shown), Bluetooth™ (not shown) and IR sensor (not shown).

Figure 2:
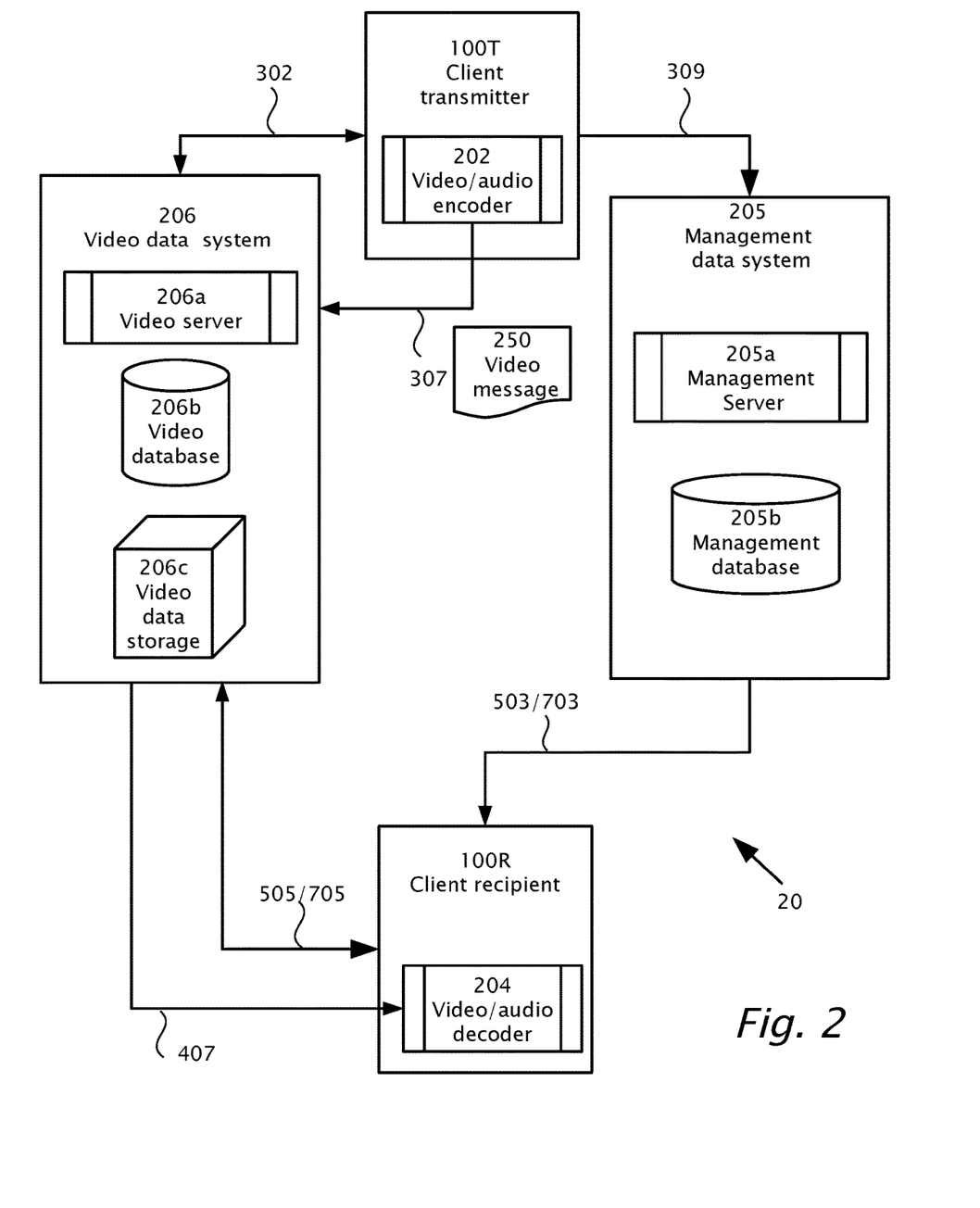
FIG. 2 shows a simplified block diagram of a system, according to features of the present invention.

Reference is now also made to FIG. 2 which shows a simplified block diagram of a system 20, according to features of the present invention. System 20 may include a first mobile computer system 100 acting as a client transmitter 100T and a second mobile computer system 100 acting as client recipient 100R. A video data system 206 including video server 206a, video database 206b and video data storage 206c connects with client transmitter 100T and client recipient 100R. A management data system 205 including a management server 205a and a management database 205b connects with client transmitter 100T and client recipient 100R. An audio-video message 250 is shown as being transmitted from client transmitter 100T to video data system 206. Message 250 may be recorded live using camera 105 while transmitting or message 250 may be previously recorded and stored in local storage 101. Video data system 206 and management data system 205 may be collocated in the same installation or even in the same hardware unit and while operating share the same power supply, for instance. Video data system 206 and management data system 205 may be implemented in different threads of a multi-threaded processor.

Figure 3A:
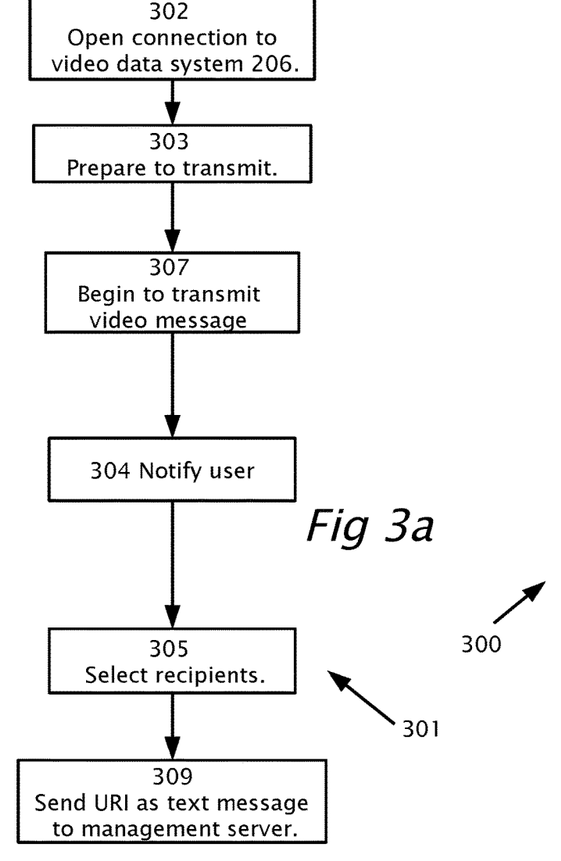
FIGS. 3a, 3b and 4 show flow charts for methods, according to features of the present invention.
Figure 3B:
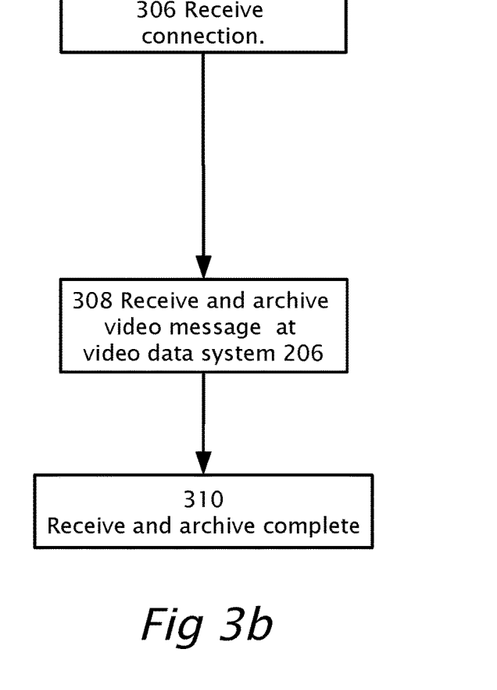

Reference is now also made to FIGS. 3a and 3b which show flow charts for respective methods 301 and 300, according to features of the present invention. Methods 301 and 300 illustrate a process of client transmitter 100T connecting and transmitting to video data system 206 in system 20, to allow a user to transmit video messages 250 to other users. Method 301 (FIG. 3a) illustrates process steps performed by client transmitter 100T and method 300 (FIG. 3b) illustrates process steps performed by server data system 206.

Referring now to system 20 and methods 301 and 300, a transmitter application according to an embodiment of the present invention is previously installed and stored in memory 101 of client transmitter 100T. The transmitter application of client transmitter 100T may connect (step 302) to video data system 206 and to video server 206a without yet receiving an explicit user instruction to transmit video message 250. Specifically, the transmitter application of client transmitter 100T based on previous user actions or prior programming may open a URI of the next video message 250 expected to be transmitted to video data storage 206c. In parallel, video server 206a of video data system 206 receives the connection (step 306). Client transmitter application in step 307 begins to transmit video message 250 and in parallel in step 308, video message 250 is being archived by video data system 206 in video data storage 206c. Video compression may be performed while recording video message 250 using camera 105. The user may be notified in step 304 that one or more video messages will be prepared for transmission. In parallel, the archiving of video data message may be completed (step 310) at video data system 206. Client transmitter 100T application may select (step 305) one or more recipients or the user of client transmitter 100T may select (step 305) one or more recipients. In step 309, a text message, including a URI, character string or message block including a reference to the recipient(s) is sent to management server 205a in management data system 205. Step 309 does not generally require an acknowledgment from management server 205a. The URI referencing audio-video message 250, is intended for relaying to the recipient(s) to expect the audio-video message and to prepare client recipient 100R for the upcoming receipt of audio-video message 250.

Several options are available for transfer of the message block from management data system 205 to client recipient 100R The message block may include: the URI to reference video message 250, a command for client 100 to expect a video message, a command for client 100 to prepare to play video message 250. Alternatively, the message block may includes only the URI to reference the message 250. Client recipient 100R is programmed so that whenever it receives a URI, a video message, 250 is expected and client recipient 100R prepares to play video message 250. In an alternative embodiment of the present invention, management server 205 may be avoided and message blocks may be transferred over a mesh network between client computer systems 100.

In method 301, transmission latency may be reduced if based on previous user interaction or prior programming, the transmitter application deems the user has a high probability that he/she is going to record using camera 105 one or more video messages 250 and to transmit within the next few seconds. The transmitter application may prepare (step 303) client transmitter 100T accordingly and/or may begin to transmit (step 307), prior to the user being notified (step 304) that video message 250 is being or has been transmitted and prior to selecting recipients (step 305).

Referring again also to FIG. 1, preparation to transmit (step 303) may include steps such as turning on a camera 105 application and opening shutter of camera 105, allocating space in memory 101 for video message 250, beginning to record and encoding video message 250 by encoder 204. Preparation to transmit (step 303) may include opening a folder in storage 101 which includes images, audio-video clips, or other multimedia messages that have not been previously received and archived (step 308) and beginning to transmit (step 307) the contents of that folder.

Figure 4:
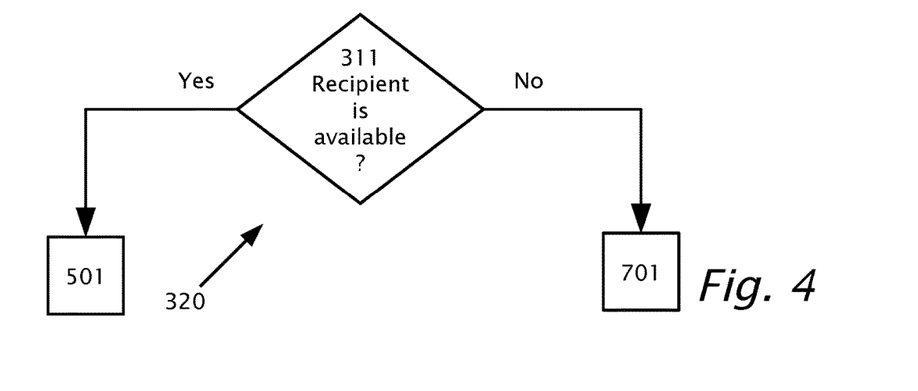
Figure 5:
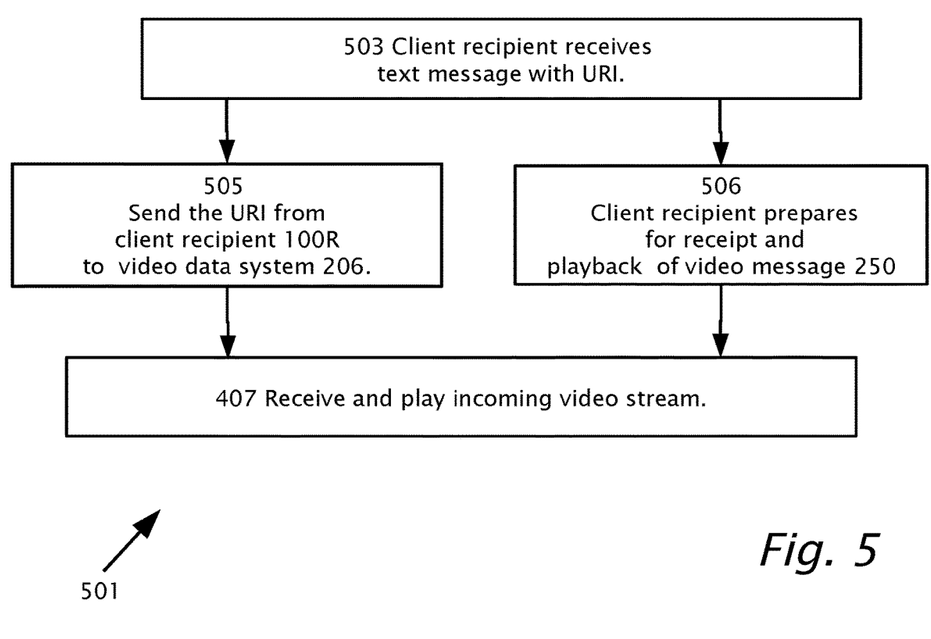
FIG. 5 illustrates a sub-process which may be performed when a client recipient is available, according to features of the present invention.

Reference is now also made to FIG. 4 which illustrates a flow diagram of a method 320, according to an aspect of the present invention. Method 320 provides for receipt of an audio-video message when client recipient 100R is available and/or subsequent audio-video message retrieval for instance when client recipient 100R is not available or unavailable during the original transmission from client transmitter 100T. In decision block 311, if client recipient 100R is available during or shortly after (within a few seconds) beginning of transmission (step 307) then the flow continues with sub-process 501 as shown in FIG. 5. If in decision block 311, if client recipient 100R is not available during or shortly after transmission, then the flow continues with sub-process 701 shown in FIG. 7.

Reference is now made also to FIG. 5 which illustrates sub-process 501 which may be performed when client recipient 100R is available, according to features of the present invention. In step 503, client recipient 100R receives character string, including a URI, which includes a reference to audio-video message 250. A character string, is sent (step 505) from client recipient 100R to video data system 206 and video data system 206 on receiving the character string referring to video message 250 reads from video storage 206c video message 250 and transmits video message 250 to client recipient 100R. In the meantime, in step 506, client recipient 100R prepares for playback and receipt of video message 250. In step 407, video message 250 is received and played by client recipient 100R. Alternatively, when client recipient 100R is available, video message 250 may be copied during transmission from client transmitter 100T and relayed by video data system 206 to client recipient 100R so that client recipient 100R is not receiving message 250 from archive 206c, According to a feature of the present invention, when client recipient 100R becomes available after beginning of transmission of video message 250 from client transmitter 100T, then video data system 206 may transmit video message 250 from the beginning of the message. The time delay between the time of the beginning of transmission to the time when client recipient 100R becomes available may be reduced during the remainder of the message thread. During the subsequent interchanges between client transmitters 100T and client recipients 100R, the client recipient will eventually catch up with the other participants in the conversation.

Figure 6:
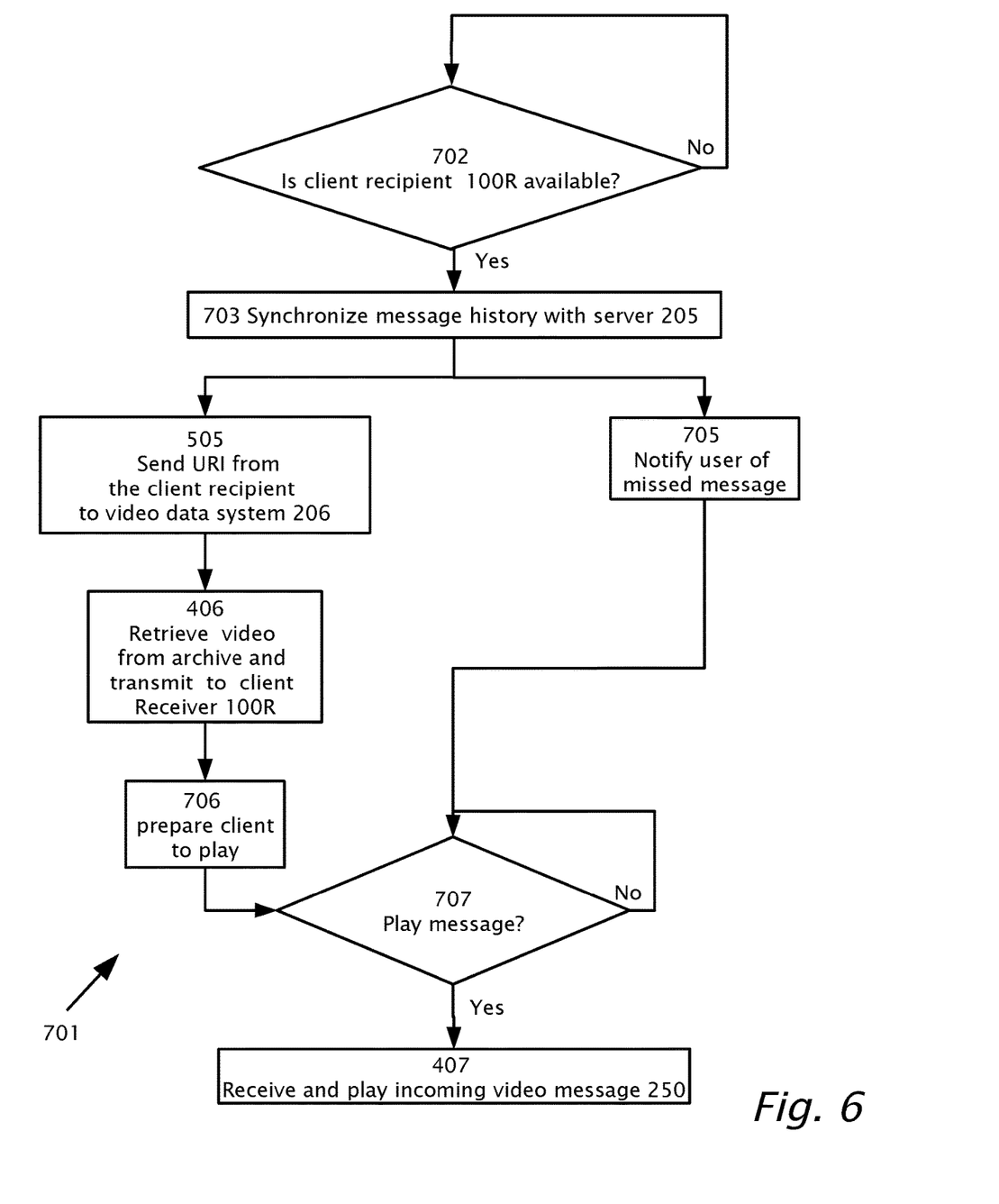
FIG. 6 illustrates a sub-process which may be performed when a client recipient is unavailable at the original time of transmission of a video message, according to a feature of the present invention.

Reference is now made also to FIG. 6 which illustrates sub-process 701 which may be performed when client recipient 100R is not available at the original time of transmission (step 307, FIG. 3) of video message 250. When client recipient 100R is available (decision block 702) at an undetermined later time, client recipient 100R synchronizes (step 703) message history with management database 205b. In step 705, the user of client recipient 100R is notified of missed messages, e.g. video message 250. At the same time, client recipient 100R may send (step 505) a character string, including a URI, to video data system 206 referring to one or more of the missed messages. Client recipient 100R application may anticipate user choice and send (step 505) character string to video data system 206 whilst receiving a response to the query in step 705 regarding missed messages. The character string is received in video data system 206, and in step 406, video message 250 is retrieved from archive 206c and video message 250 is being received by client recipient 100R. Client recipient 100R may prepare for playback, i.e. turn on the media player application, in step 706, based on previous user actions. The application running in client recipient 100R may deem that there is a high probability that the user is going to select viewing video message 250 already being received. If the user selects in decision box 707 playing of video message 250, then client recipient 100R is already prepared to play message 250 being received or already received and step 407 of receiving and playing incoming video message 250 may be performed with low overall latency.

System 20 Latency Compared with Prior Art Services

The following three equations summarize communications times for a process in which a user A sends a video message, user B listens to or displays video message sent by user A, user B creates a video message in response and User A receives, displays, listens to or views the response ContentTime=time for transfer of content of message A+time for transfer of message B TotalTime=time from beginning of the process to the end of the process Latency=TotalTime−ContentTime For services such as WhatsApp™ iMessage™, Windows™ Messenger, AOL™ Instant Messenger, the following formula may be used to calculate total communication time T for: a.

$$T=RA1+CA1+UA1+DB1+VB1+RB2+CB2+UB2+DA2+VA2$$

| No. | Step | Parameter | Value (seconds) |
|---|---|---|---|
| 1 | User A records message | RA1 | 30 |
| 2 | User A's message is compressed | CA1 | 5 |
| 3 | User A's message is uploaded | UA1 | 5 |
| 4 | User B downloads user A's message | DB1 | 5 |
| 5 | User B views user A's message | VB1 | 30 |
| 6 | User B records a response | RB2 | 30 |
| 7 | User B's response is compressed | CB2 | 5 |
| 8 | User B's response is uploaded | UB2 | 5 |
| 9 | User A downloads user B's response | DA2 | 5 |
| 10 | User A views user B's response | VA2 | 30 |
|  | Total |  | 150 |

The process of user A to send a 30 second video to user B and subsequently for user B to watch the video and send back a 30 second response to user A and for user A to view the response requires about 150 seconds. For 60 seconds of content, 150 seconds is required for the content to be transferred and viewed. In the example, the communication using a prior art service has 90 seconds of latency, 60 seconds of content for a total time of communication T of 150 seconds where latency is 71% of the total time of communication.

In contrast, using system 20 and methods 300, 301 and 501 messages 250 are transmitted by user A and received by user B in real time with a point-to-point total communication time of approximately two seconds. The result is that the user recipient has completed watching the incoming message at nearly the same time that the user transmitter began recording the message. Using methods 300, 301 and 501, total communication time TI using embodiments of the present invention may be simplified as follows:

BR=Transmit Time
TI=Time of communication between users $$TI=BRA1+LA1+BRB2+LB2$$

| No. | Step | Parameter | Value (seconds) |
|---|---|---|---|
| 1 | User A transmits a message | BRA1 | 30 |
| 2 | Network Delay | LA1 | 2 |
| 3 | User B transmits a response | BRB2 | 30 |
| 4 | Network delay | LB2 | 2 |
|  | Total |  | 64 |

A communications process using an embodiment of the present invention, in which user A sends a video message 250 of 30 second duration to user B, user B views video message 250 and in response transmits to user A a video message response 250, and user A views video message response 250, requires 64 seconds. Hence, using an embodiment of the present invention, 60 seconds of content is viewed which requires about 64 seconds to be transferred and displayed. A process using an embodiment of the present invention has a latency time of about 6.25% of the total time of communication TI.

User Experience

In embodiments of the present invention, two or more users need not be available to participate in a conversation since every video message 250 is archived (step 308) at server video data system 206. Users may be added to a group and view all prior video messages 250 that were transmitted prior to the addition of the new user.

In embodiments of the present invention, video message 250 may be transmitted (step 307) and compressed while recording message 250 in camera 105 to reduce compression and transmission latency times.

The user recipient(s) may begin streaming (step 407) a received message 250 for viewing within a few seconds of the user transmitter beginning to transmit (step 307), reducing latency time. In sum, low latency performance found according to features of the present invention create a dramatic change in user experience over prior art systems.

Queuing Messages within a Thread

Video communication system 20, according to embodiments of the present invention enables users of client computer systems 100 to alternately send and receive messages 250 as unicast (one to one) or multicast (one-to-many).

In system 20, that includes playback of incoming messages 250 in near real time, multiple incoming messages 250 may be viewed contiguously although when transmitted in real time messages 250 may overlap.

In near real time streaming video messaging system 20, according to embodiments of the present invention, video message 250 has a start time of transmission by streaming to video data system 206, a latency time until message 20 begins to be consumed at client recipient 100R, and an end time when streaming ends of message 250 being received at client recipient 100R.

According to a feature of the invention, a client 100 may either receive/consume or record/transmit video message 250 at any time but client 100 may not both consume and transmit content at the same time. A client 100 may be forced to stop one interaction to begin another, for example to stop consuming content in order to create content or vice versa.

When client recipient 100R detects an incoming message 250, various actions may happen. In one example, client recipient 100R is playing another video message 250. The user may be presented with a notification of incoming message 250 either a visual message, an audible message and/or vibration using vibrator 115 as notification. The user may select the notification via a tap or swipe on client recipient 100R which causes video message 250 currently playing to stop or pause and video message 250 relevant to the notification begins to play.

In another example, when client recipient 100R is not currently engaged playing a video message 250, client recipient 100R may be configured to play incoming message 250 without any interaction by the user.

Figure 7:
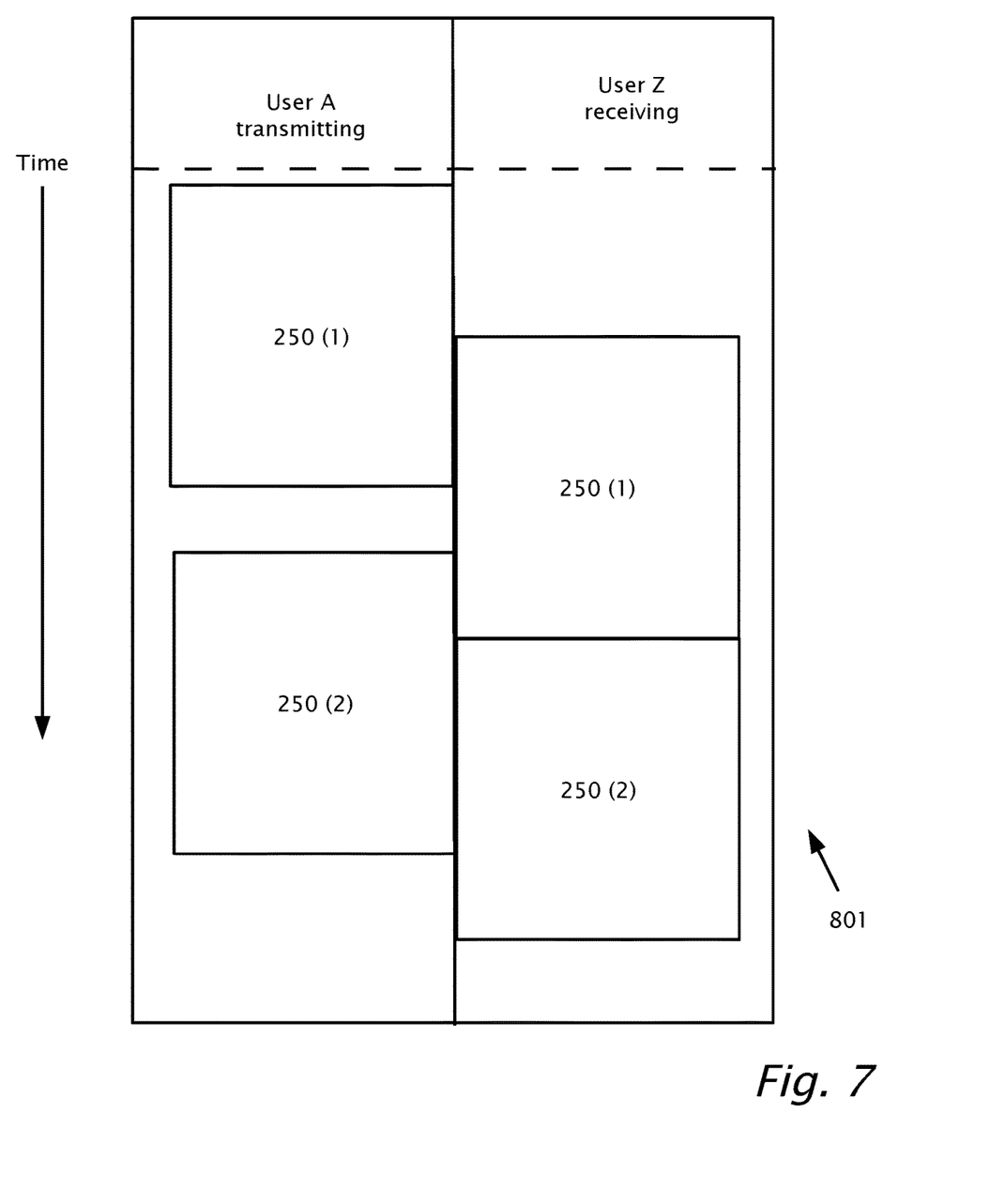
FIG. 7 illustrates a simplified timing diagram of a client transmitter transmitting two messages to a client recipient, according to a feature of the present invention.

Reference is now made to FIG. 7 which illustrates a simplified timing diagram 801 of client 100 (of user A) transmitting two messages 250(1) and 250(2) to another client 100 of user Z. The passage of time is identified by going from the top of diagram 901 to the bottom of diagram 901.

1. User A transmits message 250(1) to User Z.
2. User Z receives message 250(1) with a latency of a few seconds and begins viewing message 250(1).
3. After User A completes transmitting message 250(1), an amount of time less than the latency between the transmission of User A of message 250(1) and playback of User Z of message 250(1) passes.
4. User A begins transmitting message 250(2) to User Z.
5. User Z is unable to begin viewing message 250(2) because user Z is still viewing earlier message 250(1).
6. System 20 recognizes that message 250(1) and message 250(2) are contextually related based on the thread between the users and creates a queue that plays message 250(2) upon completion of viewing of message 250(1) by User Z.

Figure 8:
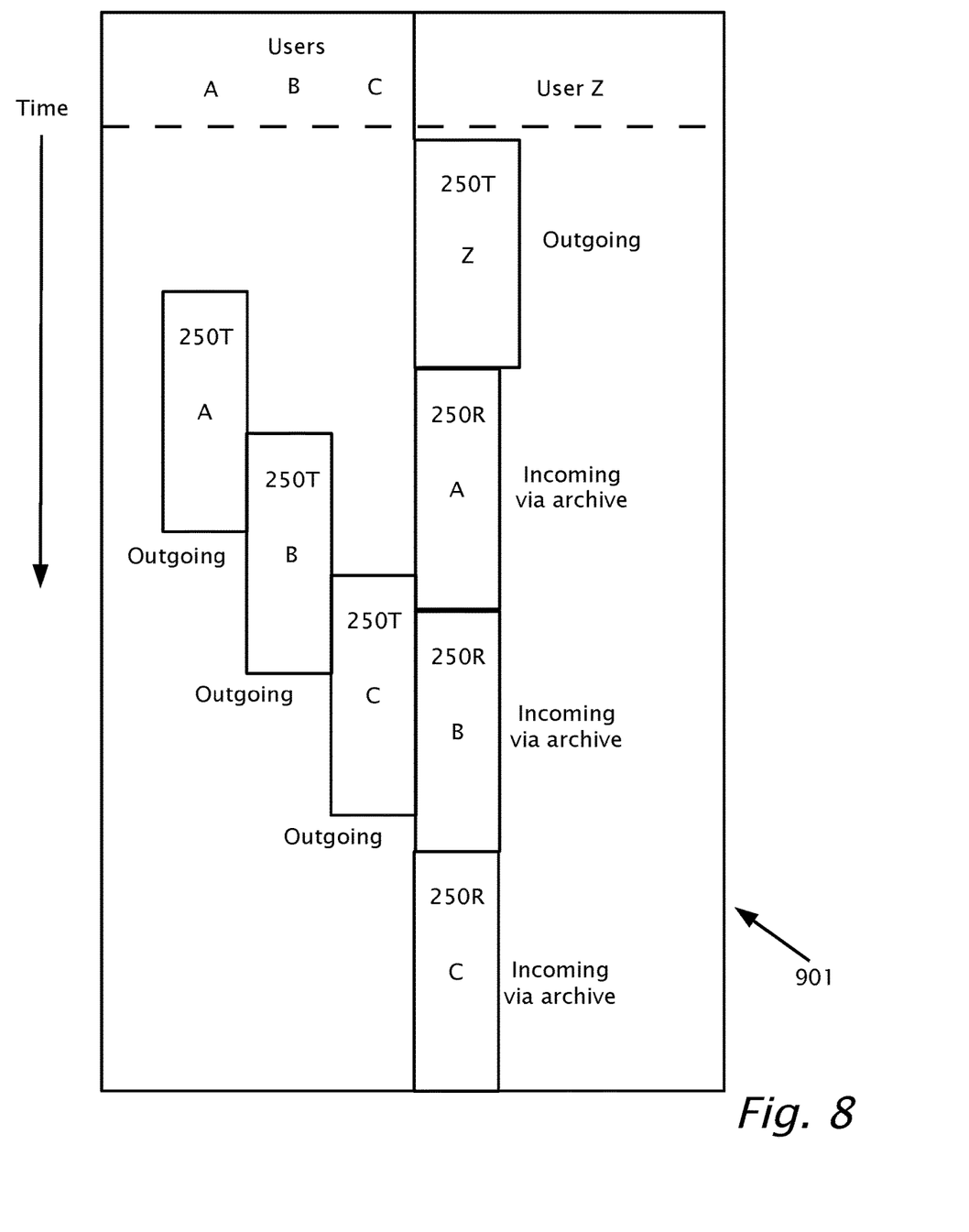
FIG. 8 illustrates a timing diagram of messages communicated between clients of a group thread, according to a feature of the present invention.

Reference is now made to FIG. 8 which illustrates a timing diagram 801 of messages 250 communicated between clients 100 of group thread, according to a feature of the present invention. The passage of time is identified by going from the top of diagram 801 to the bottom of diagram 801.

1. The User Z is engaged in a group thread with users A, B and C.
2. The User Z creates a message 250T Z.
3. While the User Z is recording and transmitting message 250T Z, user A, part of the same group thread, creates message 250T A.
4. Message 250T A is streamed in real time to the other members of the group thread, including User Z.
5. User Z is unable to immediately view incoming message 250T in real time because client 100 of user Z is still recording and transmitting outgoing message 250T Z
6. While client 100 of User A is transmitting message 250T A, client 100 of user B begins transmitting message 250T B.
7. While client 100 of user B is transmitting message 250T B, client 100 of user C begins transmitting message 250T C.
8. Messages are archived in real time by video data system 206 and client 100 of user Z is notified of incoming messages 250R A, 250R B and 250R C.
9. Client 100 of User Z forms a queue and time shifts the playback of incoming messages 250R A, 250R B and 250R C.
10. Messages 250R A, 250R B and 250R C are played contiguously typically in time sequence of transmission.

An outcome of steps 1-10 outlined above in reference to FIG. 8 is that User Z experiences messages 250 which are transmitted while overlapping in time as if each user of the thread transmitting the messages waits until the queue is clear before creating and transmitting respective video messages 250T A, 250T B and 250T C User Z may or may not be notified that he/she is consuming video messages 250R A, 250R B and 250R C as shifted in time.

Compensating for Sub-Optimal Network Conditions During Transmission

Sub-optimal network conditions may exist which may cause high latency of or loss of information from video messages 250 when users of client computer systems 100 send video messages 250. According to a feature of the present invention, client transmitter 100T may detect local network quality. If sub-optimal network quality exists, in order to maintain low latency quasi-real-time messaging, information content of messages 250 may be reduced prior to during or subsequent to recording of video message 250. Reducing information content of messages 250 may include: decreasing the video frame rate of video messages 250, reducing color resolution or even switching to monochrome video messages 250, and/or reducing video frame size, by way of examples. A reduced quality video message 250 may be transmitted and stored on video data storage 206c and available for consuming or receiving by client recipients 100R.

In order to subsequently recover the original high quality message 250, the original reduced quality message 250 or at least the dropped information thereof may be stored locally in client transmitter 100T or another device, e.g. removable disk, attachable thereto. High quality message 250 may be uploaded to replace the lower quality version previously stored on video data storage 206c so that client recipients 100R may consume or download video message 250 in higher quality subsequent to original lower quality transmission. Alternatively, the dropped information may be used to repair original message 250 on either client transmitter 100T, on video data system 206 or on client receiver 100R. Thus, reduction of video quality may be used to maintain quasi-real-time low latency messaging even under suboptimal network conditions while allowing subsequent consumption of the same message in the original quality. An example: User A is transmitting a video message 250 to User B. User A is on a network that is less than the required bandwidth for full quality video, so client transmitter 100T sends a reduced quality video message 250 to user B.

In the case that User B is watching at the time of the transmission, User B receives/consumes the reduced quality video of the video message 250 of user A.

Subsequent to the transmission of the reduced quality video message 250 from user A, client transmitter 100T may transmit the dropped information from the reduced quality video of the video message 250 of user A to user B. The dropped information may then be used to fill in the missing video information of the reduced quality video of the video message 250 as originally transmitted. So that in the case that User B is unavailable to watch the transmission live and chose to watch at a later time or, having watched the message at the time of the broadcast, returns later to re-watch video message 250, User B may view the full quality video of video message 250.

Multi-Function Button

System 20 may be implemented using a smart phone 100, e.g iPhone, equipped with a touch sensitive display 109. When a client application is installed on smart phone 100 for executing method 301, 501 and/or 701, a virtual button may be implemented on touch sensitive display 109. Alternatively, or in addition, a non-virtual or physical button may be designed into a smart phone 100 with similar functionality as the virtual button.

The button, virtual or physical may include the following modes of function:

1) Audio-Video Operation: The button may be tapped, e.g. for less than one second duration, and video recording begins using camera 205 and microphone 111 and simultaneously beginning transmission (step 307) of the video recording begins. A second tap stops the recording and stops transmission and enables reception (step 407). Toggling between states of recording/transmission and enabling reception (step 407) may be performed by successively tapping the button.

2) Audio-Video ("Push-to-talk") The button is held or touched for a defined period of time, e.g 2 seconds. Video recording begins using camera 205 and microphone 111 and simultaneously beginning transmission (step 307) of the video recording as in mode 1. Release of the button then ends recording/transmission and enables receiving (step 407) of video content.

3) Audio Only: The button is slid up and released immediately and audio recording (without live images captured from camera 205) using microphone 111 and transmission (step 307) begins. When the button is slid back to its original position audio recording/transmission is stopped and receiving is enabled (step 407). The button may be held down for a period, e.g. two seconds, while in the slid up position and the button behaves as in mode 2 above but with audio recording/transmission only. Releasing the button in the slid up position stops audio-recording and transmission.

Example: Client 100 Under Computer Control

According to other embodiments of the present invention, one or more client computer systems 100 may operate autonomously without requiring intervention of a (human) user. Processor 110 and/or another processor attached to computer system 100 may be programmed to control the operation of client computer system 100. Processor 110 may be configured to receive and transmit messages 250 simultaneously for instance within two independent message threads. Processor 110 may be programmed to analyze, process and/or parse audio only and/or audio-video messages 250 being received and to respond accordingly, by transmitting a message 250 to other users of the thread relevant to the received message 250. Processor 110 may be programmed to respond with a message 250 including educational or advertising content relevant to the audio and or visual content being shared by the users of the thread. An example, a user while shopping may in a message transmit an image of a product for which he/she wishes to receive more information. Client 100 receiving message 250 may process the images in message 250 and recognize the product, for instance using optical character recognition or bar code. Client 100 may respond with a message 250 including advertising or other information such as price and/or service information.

Example: A Camera Security System

Another example of an embodiment of the present invention in which clients 100 are under processor control is a camera security system. Multiple security cameras may be attached individually to client transmitters 100T and programmed to transmit by unicast or multicast to one or more client recipients 100R. A user, e.g. security personnel, may view the display of client transmitter 100T for suspicious activity at any/all of the sites of client transmitters 100T. One or more client recipients 100R may be fixed or mobile computer systems. The decision to transmit (decision block 304), may be previously programmed based on time interval or local image processing, e.g. significant features in a difference images between image frames. Alternatively, image processing may be performed elsewhere in network 106. Client recipient 100R may receive video messages 250 in a round-robin or random fashion, for example. If a significant event occurs such as suspicious activity based on one of messages 250, an interrupt to the round robin may be signaled by one of client transmitters 100T through management server 205a, by one of the users of client recipients 100R through management server 205a, video server 206 or by management server 205 based on the on-the-fly image processing. Central archiving of all the video messages is maintained at video data system 206 as is required in a security system for providing evidence.

Examples of Character Strings:

Example of Character String Transmitted by Client Transmitter 100T type: "video"
videoUrl: "testvsrv.video.glidetalk.com;83;6744802_www.video.glidetalk.com_vs00002.video.glidetalk.com_890260-60_v1;90;44100;1"
thumbUrl: "http://testvsrv.video.glidetalk.com:83/getthumb?sid=6744802_www.video.glidetalk.com_vs00002.video.glidetalk.com_89026060v1&Size=2"
threadId: "50aa977de43be50200000126"

A portion of a character string is transmitted by client transmitter 100T to management data system 205 referencing video message 250.
videoUrl: "89026060_v1;90;44100;1"

In response, video data system 206 may receive the following character string with the reference to video message 250.

```
{
    "videoUrl": "89026060_v1;90;44100;1"
}
```

Example of Character String Received by Client Recipient 100R

```
{
    "context": "message",
    "key": "new",
    "threadId": "50aa977de43be50200000126",
    "messageId": "50aa97fa9377370200000159",
    "senderId": "50aa11a4ab55b6020000004c",
    "senderInfo": {
        "fbId": "514969962",
        "name": "Jonathan Joseph Caras",
        "picUrl": "http://profile-b.xx.fbcdn.net/hprofile-snc6/273765_514969962_1714973208_s.jpg"
    },
    "status": "active",
    "type": "video",
    "createdAt": 1355984953,
    "isHidden": "false",
    "isDelivered": "false",
    "videoUrl":
"testvsrv.video.glidetalk.com;83;6744802_www.video.glidetalk.com_vs00002.video.glidetalk.com_89026060_v1;90;44100;1",
    "thumbUrl": "http://testvsrv.video.glidetalk.com:83/getthumb?sid=6744802_www.video.glidetalk.com_vs00002.video.glidetalk.com_89026060_v1&Size=2"
}
```

Definitions

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a phone or Personal Digital Assistant PDA) where internal modules (such as a memory and processor) work together to perform operations on electronic data. While any computer system may be mobile, the term "mobile computer system" especially includes laptop computers, notebook computers, cellular telephones, smart phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a transitory computer-readable medium. Combinations of the above should also be included within the scope of computer-readable media. Computer-executable instructions comprise, for example, instructions and data which cause a general-purpose computer system or special-purpose computer system to perform a certain function or group of functions. The term "server" as used herein, refers to a computer system including a processor, data storage and a network adapter generally configured to provide a service over the computer network. The term "client" as used herein is a computer system which receives a service provided by the server The term "video" refers to capture and display of an image or more than one image optionally in a time sequence. The term "video" includes audio when there is sound accompanying the image or images according to any of the known techniques for combining video and audio information. The terms "video" and "audio-video" are used herein interchangeably. The terms "video" and "audio-video" may include multiple signals such as stereo audio combined with video and/or three dimensional video combined with audio.

The term "message" as used herein refers to an audio-video content or audio accompanying one or more images captured live by a camera or a previously captured image or video.

The term "multicast" as used herein is the delivery of an audio-video message to a group of destination computer systems simultaneously in a single transmission from the source or transmitting computer system.

The term "unicast" as used herein refers to transmitting an audio-video message to a single designated computer system.

The term "broadcast" as used herein refers to transmitting an audio-video message to all possible destinations.

The term "upload" as used herein refers to a data file previously stored locally on a client computer system in local storage and copied to storage in a server.

The term "download" as used herein refers to a data file previously stored on a server and copied to a client computer system into local storage.

The term "uniform resource identifier" or "URI" as used herein is a string of characters used to identify a name or a resource and enables interaction with representations of the resource over a network (typically the World Wide Web) using specific protocols. Schemes specifying a concrete syntax and associated protocols define each URI. URIs can be classified as uniform resource locators (URLs), and/or as uniform resource names (URNs).

The term "character string" or "message block" as used herein includes identifiers of a name and/or location of a network resource, e.g. a video message and/or identifiers to one or more client recipients. The character string or message block may include URI, URN and URL or portion thereof. The "character string" may be encoded into binary code transmitted and received in binary code and decoded at the receiver to determine identifiers of the recipient and the video message as applicable.

The terms "client transmitter" and "client recipient" as used herein refer to a client computer system for which an example is shown as mobile computer system 100 in FIG. 1. The roles of transmitter and recipient referring to one-way communication may be reversible.

The term "alternately" in the context of transmitting and receiving video messages refers to a computer system configured to either transmit or receive but not to both transmit and receive video content simultaneously at the same time.

The term "streaming" as used herein refers to consuming video content while optionally using client storage 101 as temporary cache storage while avoiding saving an accessible copy of the video content in a local file in storage 101 in client computer system 100.

The term "consuming" in the context of video and/or audio content refers to displaying the video content to the user including the accompanying audio, or in the case of audio content, playing the audio content to the user. The terms "consume", "play" and "display" are used herein interchangeably.

The term "receive" as used herein in the context of receiving a video message and/or video content includes in different embodiments of the present invention: streaming and consuming the video content; and/or copying the video content into local storage 101 and later consuming the video content from the storage 101.

The term "latency" as used herein refers to the time between a client transmitter begins to transmit a video message and the time when the video message is received and displayed by streaming to the client recipient when the client recipient is available.

The terms "reduced latency or "low latency" are used herein interchangeably and refers in different embodiments to the latency less than six seconds or less than five seconds or less than four seconds or less than three seconds or less than two seconds.

The term "available" refers to a client computer system which is connected to a data communications network over which an embodiment of the present invention is operable and with the client application for performing method 301 running.

The term "unavailable" refers to a client computer system which is not connected to a data communications network over which an embodiment of the present invention is operable or connected to a data communications network 20 but with the client application for performing method 301 running in the background or with the client application not installed or otherwise disabled.

The term "conversation" as used herein refers to sharing one or more messages over a network between two or more people.

The term "thread" in the context of messages is used herein to refer to multiple messages transmitted and received between two or more client computer systems 100 while optionally maintaining the time order of transmission of the messages.

The indefinite articles "a", "an" is used herein, such as "a connection", "a server", a "message" have the meaning of "one or more" that is "one or more connection", "one or more servers" and "one or more messages".

Other Embodiments of the Present Invention

Various buttons may be installed on the client computer system for control of the client computer system according to methods as disclosed herein. A button may include a mode when the button is tapped for less than one second duration, then video recording begins and simultaneously transmission begins of the video recording. A second tap may stop the recording and thereby stop transmission and enable reception. Toggling between states of recording/transmission and enabling reception may be performed by successively tapping the button intermittently.

The button may also include a mode in which the button is held or touched for a defined period of time, e.g 2 seconds. Video recording may begin and simultaneous transmission may begin of a video recording. Release of the button may end recording/transmission and enable receiving of video content. In another mode, the button is slid in a previously defined direction and released immediately within a previously defined time period. Audio recording (without simultaneous capture of images) and transmission may begin. When the button is slid back to its original position audio recording/transmission may be stopped and receiving is enabled. The button may be held down for a time period, e.g. two seconds, while in the slid position for audio recording/transmission only. Releasing the button in the slid position stops audio-recording and transmission.

Various data communications systems are disclosed herein video communications between multiple computer systems configured to transmit and receive video content. One (or more) of the client computer systems when transmitting is a client transmitter and one (or more) of the client computer systems when receiving is a client recipient. The client transmitter is enabled to transmit a video message for display on the client recipient. The client transmitter is configured to establish a connection with a video server, to transmit the video message to the video server. The video message is archived by the video server. A first client computer system may transmit multiple messages to a second client computer system, The multiple messages includes a first message and a second message. The time interval TTX between the beginning of the first message and the end of the second message when transmitted by the client transmitter may be greater than the time interval TRX between the beginning of the first message and the end of the second message when received by the client recipient, so that the client recipient receives the first and the second messages contiguously while transmission of at least one of the multiple messages is ongoing.

Various data communications systems are disclosed herein video communications between multiple computer systems configured to transmit and receive video content. One (or more) of the client computer systems when transmitting is a client transmitter and one (or more) of the client computer systems when receiving is a client recipient. The client transmitter is enabled to transmit a video message for display on the client recipient. The client transmitter is configured to establish a connection with a video server, to transmit the video message to the video server. The video message is archived by the video server. Multiple messages intended for the same client recipient may at least partially overlap in time during respective transmission of the multiple messages from multiple client transmitters. The multiple messages are received at the client recipient contiguously and shifted in time while the transmission of at least one of the messages from at least one of the client transmitters is ongoing.

Various data communications systems are disclosed herein video communications between multiple computer systems configured to transmit and receive video content. One (or more) of the client computer systems when transmitting is a client transmitter and one (or more) of the client computer systems when receiving is a client recipient. The client transmitter is enabled to transmit a video message for display on the client recipient. The client transmitter is configured to establish a connection with a video server, to transmit the video message to the video server. The video message is archived by the video server. One or more of the client computer systems may be controlled by a processor configured to receive a message by streaming from the video server, to process the received message and in response to the received message to transmit a response message to other client computer systems sharing the same thread. If the client transmitter detects or is otherwise aware of suboptimal network conditions, the video message may be reduced into a video message of reduced information content so that the second video message may be received/consumed when the transmission from the client transmitter of the video message is still ongoing. Subsequent to the original transmission of the video message of reduced information content, the original video message of higher quality may be restored or replaced for subsequent reception/consumption by the client recipient.

Various data communications systems are disclosed herein including a video communications between multiple client computer systems configured to transmit and receive video content. A client computer system is configured to establish a connection with a video server, to transmit a transmit video message to the video server and to receive a receive video message from the video server. The transmit video message and the receive video message are archived by the video server. If the receive message begins to be received while the transmit video message is being transmitted, then, the receive message is stored locally at least in part in local storage in the client computer system for display to the user of the client computer system subsequent to the transmission of the transmit video message. Otherwise, if the receive message is received not overlapping the transmission of the transmit message then the receive message is displayed to the user as a stream from the video server while avoiding storage of the receive message in local storage. in the client computer system.

A user interface is provided herein of a client computer system connectable to a data communications system. The user interface allows the user to experience selectably either: transmitting a transmit video message or consuming a receive video message. The transmit video message may include an image frame being captured simultaneously during the transmission. If a receive message is being consumed during the capture of image frames or during the transmission/recording of the transmit message, the receive message may be stored at least in part in local storage attached to the client computer system The receive message may be displayed to the user when the transmission of the transmit message is complete by retrieving the receive message from the local storage. If an incoming message is being consumed a transmit message may be transmitted in the background of the client computer system at the same time by retrieving the transmit message from local storage.

Although selected embodiments of the present invention have been shown and described, it is to be understood the present invention is not limited to the described embodiments.

The invention claimed is:

1. A system for providing multimedia messaging, the system comprising:

at least one processor configured to:
receive, at one or more intermediary servers, streaming multimedia data from a transmitting messaging client without an indication of an identity of a receiving messaging client, wherein the transmitting messaging client has previously been provisioned with a predetermined storage location at an external data storage for storing the streaming multimedia data, and wherein the provisioning occurs before the streaming of the multimedia data begins;
after the streaming of the multimedia data begins and before the streaming of the multimedia data ends:
receive and store, by the one or more intermediary servers, the streaming multimedia data at the predetermined storage location;
receive, at the one or more intermediary servers, from the transmitting messaging client, an identification of the receiving messaging client;
transmit, by the one or more intermediary servers to the receiving messaging client, an identifier of the transmitting messaging client and a command referencing a preparation to display the multimedia message at the receiving messaging client, in response to at least receiving the identification of the receiving messaging client;
provide the streaming multimedia data received at the one or more intermediary servers to the receiving messaging client, after the identification of the receiving messaging client has been received and before the streaming of the streaming multimedia data ends;
wherein the receiving messaging client is configured to prepare initiation of an application on the receiving messaging client configured to display the multimedia message based on the command, and wherein the preparation is based on a prior interaction of a user with the receiving messaging client and wherein the preparation is predicted based on the prior interaction of the user with the receiving messaging client.

2. The system of claim 1, wherein the at least one processor is configured to send the streaming multimedia data to the receiving messaging client in response to a received request for the streaming multimedia data.

3. The system of claim 1, wherein the system includes at least one multimedia server configured to receive the streaming multimedia data from the transmitting messaging client and at least one management server configured to receive the identification of the receiving messaging client.

4. The system of claim 1, wherein the identification of the receiving messaging client is received as part of a message including an identifier associated with the streaming multimedia data.

5. The system of claim 1, wherein the identification of the receiving messaging client includes a group identifier associated with more than one receiving messaging client.

6. The system of claim 1, wherein the at least one processor is configured to send the streaming multimedia data to the receiving messaging client from the beginning of the streaming multimedia data.

7. The system of claim 1, wherein the at least one processor is configured to provide the streaming multimedia data to the receiving messaging client while receiving the streaming multimedia data from the transmitting messaging client.

8. A computer-implemented method for providing multimedia messaging, the method comprising:
receiving, at one or more intermediary servers, streaming multimedia data from a transmitting messaging client without an indication of an identity of a receiving messaging client, wherein the transmitting messaging client has previously been provisioned with a predetermined storage location at an external data storage for storing the streaming multimedia data, and wherein the provisioning occurs before the streaming of the multimedia data begins;

after the streaming of the multimedia data begins and before the streaming of the multimedia data ends:

receiving and storing, by the one or more intermediary servers, the streaming multimedia data at the predetermined storage location;

receiving, at the one or more intermediary servers, from the transmitting messaging client, an identification of the receiving messaging client;

transmitting, by the one or more intermediary servers to the receiving messaging client, an identifier of the transmitting messaging client and a command referencing a preparation to display the multimedia message at the receiving messaging client, in response to at least receiving the identification of the receiving messaging client; and providing the streaming multimedia data received at the one or more intermediary servers to the receiving messaging client, after the identification of the receiving messaging client has been received and before the streaming of the streaming multimedia data ends;

wherein the receiving messaging client is configured to prepare initiation of an application on the receiving messaging client configured to display the multimedia message based on the command, and wherein the preparation is based on a prior interaction of a user with the receiving messaging client and wherein the preparation is predicted based on the prior interaction of the user with the receiving messaging client.

9. The computer-implemented method of claim 8, further comprising:

establishing a connection with the transmitting messaging client before receiving the streaming multimedia data; and providing to the transmitting messaging client an identifier associated with the streaming multimedia data to be received.

10. The computer-implemented method of claim 8, wherein the identification of the receiving messaging client is received as part of a message including an identifier associated with the streaming multimedia data.

11. The computer-implemented method of claim 8, wherein the identification of the receiving messaging client includes a group identifier associated with more than one receiving messaging client.

12. The computer-implemented method of claim 8, wherein sending the streaming multimedia data to the receiving messaging client includes sending the streaming multimedia data to the receiving messaging client from the beginning of the streaming multimedia data.

13. The computer-implemented method of claim 8, wherein sending the streaming multimedia data to the receiving messaging client comprises sending the streaming multimedia data to the receiving messaging client while receiving the streaming multimedia data from the transmitting messaging client.

14. A non-transitory computer readable medium including instructions that, when executed by at least one processor, cause the at least one processor to perform operations comprising:

sending, from a transmitting messaging client to one or more intermediary servers, streaming multimedia data, without an indication of an identity of a receiving messaging client, wherein the transmitting messaging client has previously been provisioned with a predetermined storage location at an external data storage for storing the streaming multimedia data and wherein the provisioning occurs before the streaming of the multimedia data begins;

after the streaming of the multimedia data begins and before the streaming of multimedia data ends:

transmitting, by the transmitting messaging client to the one or more intermediary servers, the streaming multimedia data at the predetermined storage location;

sending, from the transmitting messaging client to the one or more intermediary servers, an identification of the receiving messaging client, and a command referencing a preparation to display the multimedia message at the receiving messaging client;

wherein the one or more intermediary servers are configured to send to the receiving messaging client, after the identification of the receiving messaging client has been received and before the streaming of the streaming multimedia data ends, streaming multimedia data received at the one or more intermediary servers;

wherein the receiving messaging client is configured to prepare initiation of an application on the receiving messaging client configured to display the multimedia message based on the command, and wherein the preparation is based on a prior interaction of a user with the receiving messaging client and wherein the preparation is predicted based on the prior interaction of the user with the receiving messaging client.

15. The non-transitory computer readable medium of claim 14, wherein the operations further comprise:

connecting to the one or more intermediary servers before sending the streaming multimedia data; and receiving from the one or more intermediary servers an identifier associated with the streaming multimedia data.

16. The non-transitory computer readable medium of claim 14, wherein the operations further comprise sending to the one or more intermediary servers a request for the predetermined storage location reserved on the one or more intermediary servers for the streaming multimedia data.

* * * * *